(12) United States Patent
Shimono et al.

(10) Patent No.: US 10,100,546 B2
(45) Date of Patent: Oct. 16, 2018

(54) SUPPORT STRUCTURE

(71) Applicant: MITSUBISHI HITACHI POWER SYSTEMS, LTD., Kanagawa (JP)

(72) Inventors: Masaki Shimono, Tokyo (JP); Kunihiro Morishita, Tokyo (JP); Motoki Kato, Tokyo (JP); Yuji Kuroda, Tokyo (JP); Tatsuya Amano, Tokyo (JP); Keiichi Moritsuka, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/605,359

(22) Filed: May 25, 2017

(65) Prior Publication Data

US 2017/0260767 A1 Sep. 14, 2017

Related U.S. Application Data

(63) Continuation of application No. PCT/JP2015/005857, filed on Nov. 25, 2015.

(30) Foreign Application Priority Data

Nov. 25, 2014 (JP) .................................. 2014-238043

(51) Int. Cl.
*E04H 9/02* (2006.01)
*E04H 5/02* (2006.01)
(Continued)

(52) U.S. Cl.
CPC ............... *E04H 9/022* (2013.01); *E04B 1/36* (2013.01); *E04B 1/985* (2013.01); *E04H 5/02* (2013.01); *G01V 1/28* (2013.01)

(58) Field of Classification Search
CPC .. E04B 1/36; E04B 1/985; G01V 1/28; E04H 9/02; E04H 5/02
See application file for complete search history.

(56) References Cited

U.S. PATENT DOCUMENTS 5,462,141 A * 10/1995 Taylor ...................... E04H 9/02
5,816,559 A * 10/1998 Fujimoto .................. E04H 9/02
(Continued)

FOREIGN PATENT DOCUMENTS

| JP | 9-328819 | 12/1997 |
|---|---|---|
| JP | 10-325261 | 12/1998 |

(Continued)

OTHER PUBLICATIONS

International Preliminary Report on Patentability dated May 30, 2017 in International (PCT) Application No. PCT/JP2015/005857.
(Continued)

*Primary Examiner* — Beth A Stephan
(74) *Attorney, Agent, or Firm* — Wenderoth, Lind & Ponack, L.L.P.

(57) ABSTRACT

In a boiler support structure in which certain seismic isolators are provided with a pullout countermeasure, the seismic isolators to be provided with the pullout countermeasure are individually identified according to whether the seismic isolator satisfies Formula (1): $N_{Dn} + N_{EQn} > N_{tn}$ ... Formula (1), where $N_{Dn}$ ($N_{Dn} < 0$) is a compressive load occurring on each of the seismic isolators and calculated on the basis of a permanent load imposed on the boiler support structure; $N_{EQn}$ ($N_{EQn} > 0$) is a pullout force occurring on each of the seismic isolators and calculated on the assumption that an earthquake has occurred; and $N_{tn}$ ($N_{tn} > 0$) is an allowable pullout force of each of the seismic isolators and calculated using an allowable pullout stress of each of the seismic isolators.

17 Claims, 13 Drawing Sheets

(51) Int. Cl.
*E04B 1/36* (2006.01)
*E04B 1/98* (2006.01)
*G01V 1/28* (2006.01)

(56) References Cited

U.S. PATENT DOCUMENTS

| | | | |
|---|---|---|---|
| 5,970,666 A * | 10/1999 | Kurabayashi | E02D 27/34 |
| 6,648,295 B2 * | 11/2003 | Herren | E04H 9/02 |
| 2014/0360108 A1 * | 12/2014 | Fujiu | F16F 15/04 |
| 2016/0115703 A1 * | 4/2016 | Katayama | E04H 9/02 |
| 2016/0265243 A1 * | 9/2016 | Shimono | E04H 9/02 |
| 2017/0350152 A1 * | 12/2017 | Moreno | E04H 9/02 |

FOREIGN PATENT DOCUMENTS

| | | | | |
|---|---|---|---|---|
| JP | 11-166331 | | 6/1999 | |
| JP | 2005-61565 | | 3/2005 | |
| JP | 2006-90078 | | 4/2006 | |
| JP | 2007-63941 | | 3/2007 | |
| JP | 2010-37789 | | 2/2010 | |
| JP | 2011-162982 | | 8/2011 | |
| JP | 2011220010 | * | 11/2011 | ............ E02D 27/34 |
| JP | 5096877 | | 12/2012 | |
| JP | 2013-130029 | | 7/2013 | |
| JP | 2014001767 | * | 1/2014 | ............ F16F 15/04 |
| JP | 2015-121045 | | 7/2015 | |

OTHER PUBLICATIONS

International Search Report dated Feb. 16, 2016 in International (PCT) Application No. PCT/JP2015/005857.

* cited by examiner

R: VERTICAL FORCE OF EARTHQUAKE

R: VERTICAL FORCE OF EARTHQUAKE

R: VERTICAL FORCE OF EARTHQUAKE

R1: VERTICAL FORCE OF
    PERMANENT LOAD
R2: VERTICAL FORCE OF
    EARTHQUAKE LOAD
R3: R1 + R2

R1: VERTICAL FORCE OF
    PERMANENT LOAD
R2: VERTICAL FORCE OF
    EARTHQUAKE LOAD
R3: R1 + R2

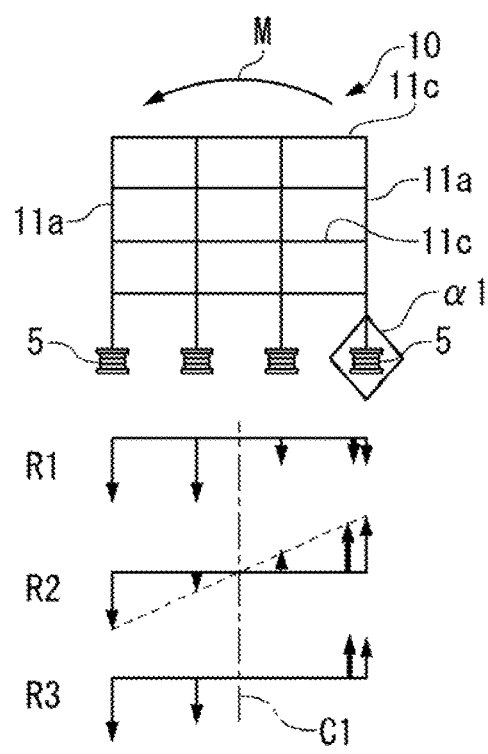
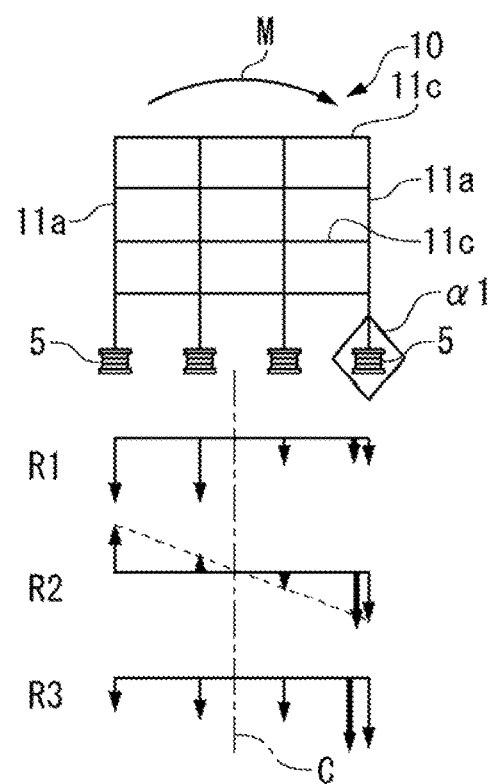
FIG. 6C
R1: VERTICAL FORCE OF PERMANENT LOAD
R2: VERTICAL FORCE OF EARTHQUAKE LOAD
R3: R1 + R2
FIG. 6D
R1: VERTICAL FORCE OF PERMANENT LOAD
R2: VERTICAL FORCE OF EARTHQUAKE LOAD
R3: R1 + R2

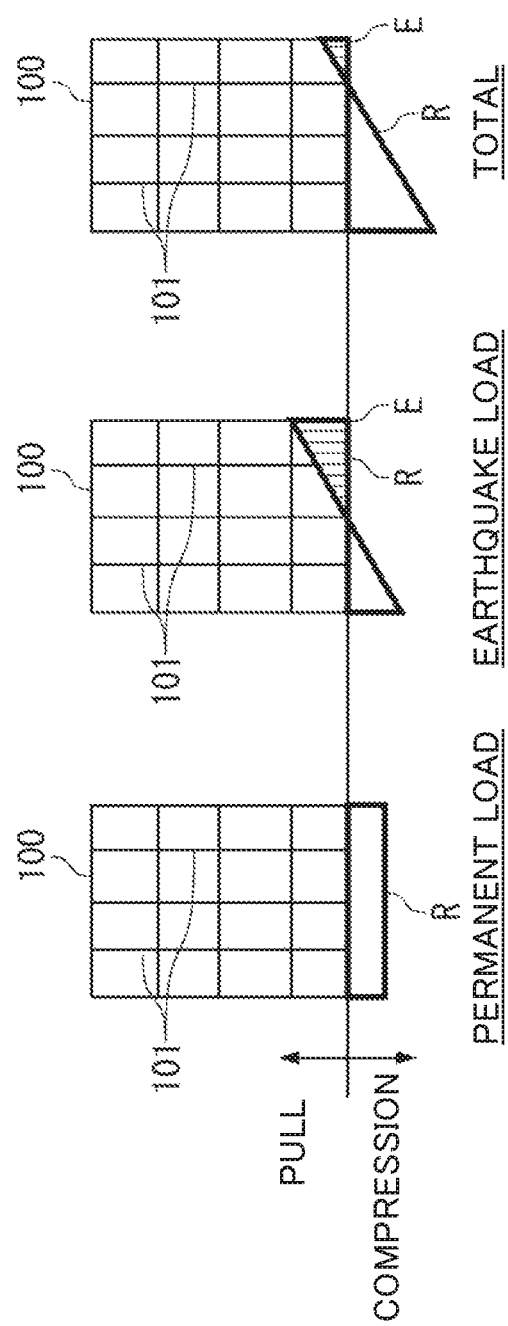
FIG. 12A - PRIOR ART  FIG. 12B - PRIOR ART  FIG. 12C - PRIOR ART
PERMANENT LOAD   EARTHQUAKE LOAD   TOTAL

SUPPORT STRUCTURE

TECHNICAL FIELD

The present disclosure relates to a support structure in which a pullout countermeasure is efficiently provided.

BACKGROUND ART

In a common structure 100 such as a building, a vertical reactive force acting on column bases 101 against a permanent load (a dead load permanently acting thereon, including the weight of the structure and a superimposed load) is substantially evenly balanced in a planar direction, and a vertical force R substantially evenly acts on seismic isolators when the structure is seismically isolated (see FIG. 12A). However, when a horizontal force is exerted by an earthquake and thus an overturning moment is exerted, a pullout (tensile) force tends to prevail at an end E of the structure 100. Therefore, the seismic isolators at the end E of the common structure 100 are provided with a pullout countermeasure (see FIGS. 12B and 12C).

In the case of a plant support structure such as a boiler steel frame, however, a vertical reactive force on the column bases is unevenly balanced in a planar direction due to the load of equipment to be supported, so that a pullout force does not always act on the end of the structure. Thus, in the case of a plant support structure, the position where a pullout countermeasure should be provided cannot be uniformly determined to be the end as in a common structure.

For example, Japanese Patent Laid-Open No. 10-325261 and Japanese Patent Laid-Open No. 2005-61565 disclose proposals pertaining to a pullout countermeasure.

Japanese Patent Laid-Open No. 10-325261 proposes providing a high-rise building with an internal space that penetrates stories at a center part and supporting the building with laminated rubber bearings having an allowable value of long-term contact pressure of 150 to 300 kg/cm². According to this proposal, the building is provided with the internal space so that, compared with a building that has the same area of occupation and does not have an internal space, a long-term load on a lower part of the building is largely imposed on the laminated rubber bearings at peripheral edges. This makes it less likely that the building is overturned or that a pullout force occurs on the laminated rubber bearings.

Japanese Patent Laid-Open No. 2005-61565 proposes a laminated rubber bearing having a laminated rubber and flanges on the upper and lower sides thereof, in which the bending rigidity of the upper and lower flanges is set to such rigidity that the flanges can undergo out-of-plane bending deformation under an axial tensile force smaller than an axial tensile force that is large enough to damage the laminated rubber. According to this proposal, when a lift occurs in a superstructure, before a damaging vertical pullout force acts on the laminated rubber, the upper and lower flanges, which have lower rigidity than the laminated rubber, undergo bending deformation while exerting a resisting force according to a vertical shift, so that the risk of the pullout force acting on the laminated rubber can be eliminated or reduced.

SUMMARY OF INVENTION

Technical Problem

It is acknowledged that the proposals of Japanese Patent Laid-Open No. 10-325261 and 2 have their respective effects stated therein, but these disclosures do not suggest a position where a pullout countermeasure should be provided in a plant support structure.

Therefore, at least one embodiment of the present invention aims to propose a technique of providing a pullout countermeasure by easily identifying a location where a pullout force occurring on a seismic isolator becomes excessive, even in a structure like a plant support structure in which a position where the pullout countermeasure should be provided cannot be uniformly determined.

Solution to Problem

A support structure of at least one embodiment of the present invention having been devised to achieve the above object includes:

an object to be supported;

a plurality of columns erected on a foundation through column bases;

a plurality of beams connecting adjacent ones of the columns to each other;

a support steel frame supporting the object to be supported; and a plurality of seismic isolators supporting one or a plurality of the columns, wherein certain ones of the seismic isolators are provided with a pullout countermeasure, and the seismic isolators to be provided with the pullout countermeasure are individually identified according to whether the seismic isolator satisfies the following Formula (1):

$$N_{Dn}+N_{EQn}>N_{tn} \qquad \text{Formula (1),}$$

where $N_{Dn}$, $N_{EQn}$, and $N_{tn}$ are defined as follows:

$N_{Dn}$ ($N_{Dn}<0$) is a compressive load occurring on each of the seismic isolators and calculated on the basis of a permanent load imposed on the support structure;

$N_{EQn}$ ($N_{EQn}>0$) is a pullout force occurring on each of the seismic isolators and calculated on the assumption that an earthquake has occurred; and $N_{tn}$ ($N_{tn}>0$) is an allowable pullout force of each of the seismic isolators and calculated using an allowable pullout stress of each of the seismic isolator.

In the present invention, the pullout force and the compressive force are respectively defined as a positive (+) load and a negative (−) load.

According to the support structure of embodiments of the present invention, it is possible to identify the location where the pullout force occurring on the seismic isolator becomes excessive by a simple calculation, and to provide only those identified seismic isolators with the pullout countermeasure. Thus, according to the present invention, the number of locations where the pullout countermeasure is to be provided can be reduced compared with if the pullout countermeasure is uniformly provided at ends of the support structure.

It is preferable that the pullout force $N_{EQn}$ in the present invention be calculated on the basis of the following Formula (2):

$$N_{EQn}=M/B_n \qquad \text{Formula (2),}$$

where M and $B_n$ of Formula (2) are defined as follows:

M is an overturning moment occurring on a seismic isolation layer when a horizontal force P acts at a center of gravity G of a superstructure and calculated on the basis of the following Formulae (3) and (4), the seismic isolation layer being a story which is located between the superstructure and the foundation and in which the seismic isolators are provided, the superstructure being a part of the structure located above the seismic isolation layer; and $B_n$ is a length of an arm of the overturning moment M on each of the seismic isolators.

$$P = Sa \times m \quad \text{Formula (3),}$$

$$M = P \times L \quad \text{Formula (4),}$$

where Sa, m, P, and L of Formulae (3) and (4) are defined as follows:

Sa is a response acceleration in a natural period T of the part of the structure located above the seismic isolation layer (superstructure) and calculated from a response spectrum of a design earthquake wave;

m is a mass of the superstructure;

P is a horizontal force on the superstructure; and

L is a distance in a vertical direction from the center of gravity G of the superstructure to the center of the seismic isolation layer in a height direction.

According to embodiments of the present invention, an earthquake response analysis that is usually conducted when calculating a pullout force occurring on a seismic isolator is not conducted, which allows a simple calculation of a pullout force occurring on a seismic isolator. Thus, according to the present invention, compared with if an earthquake response analysis is conducted, the time and effort required for the calculation process can be significantly saved, so that the design man-hours can be significantly reduced.

The pullout countermeasure in at least one embodiment of the present invention can include at least the following first form and second form.

The first form involves increasing the pullout proof strength of the seismic isolator that is determined to require the pullout countermeasure, and the second form involves providing a load transfer member that transfers the pullout force from the column (base) supported by the seismic isolator that is determined to require the pullout countermeasure to another of the columns. In the present invention, it is possible to select only one of the first form and the second form, or to combine the first form and the second form.

In the case where the first form is implemented, the pullout countermeasure can be provided so that a neutral axis of a seismic isolation layer does not shift from a position thereof before the pullout countermeasure is provided.

Alternatively, in the case where the first form is implemented, the pullout countermeasure can be provided so that a neutral axis of a seismic isolation layer shifts from a position thereof before the pullout countermeasure is provided.

One of the above options can be selected according to the position of the neutral axis of the seismic isolation layer before the pullout countermeasure is provided.

As a pullout countermeasure corresponding to the second form, the column supported by the seismic isolator that is identified as requiring the pullout countermeasure and another of the columns can be coupled together by one or both of a tie beam and a horizontal brace, or an RC slab can be provided between the column supported by the seismic isolator that is identified as requiring the pullout countermeasure and another of the columns.

In embodiments of the present invention, a pullout prevention mechanism can be provided that couples together the tie beam and the foundation in parallel to the seismic isolator.

In embodiments of the present invention, equipment can be installed on the RC slab in a region around the column supported by the seismic isolator that is identified as requiring the pullout countermeasure.

Advantageous Effects of Invention

According to the support structure of at least one embodiment of the present invention, it is possible to identify a location where a pullout force occurring on a seismic isolator becomes excessive by a simple calculation, and to provide only those identified seismic isolators with a pullout countermeasure. Thus, according to the embodiments of the present invention, the number of locations where the pullout countermeasure is to be provided can be reduced compared with if the pullout countermeasure is uniformly provided at the ends of the support structure.

BRIEF DESCRIPTION OF DRAWINGS

FIGS. 6A to 6D are views showing a third embodiment.

FIGS. 12A to 12C are views showing a vertical force R on a common building (structure).

DETAILED DESCRIPTION OF THE INVENTION

The present invention will be described in detail below on the basis of embodiments shown in the accompanying drawings.

First Embodiment

A feature of this embodiment is that, for a boiler support structure as a support structure, a position where a pullout countermeasure is to be provided is efficiently identified and the pullout countermeasure is disposed accordingly.

An example of the configuration of the boiler support structure to which this procedure is applied will be described before a procedure of disposing the pullout countermeasure.

Figure 1:
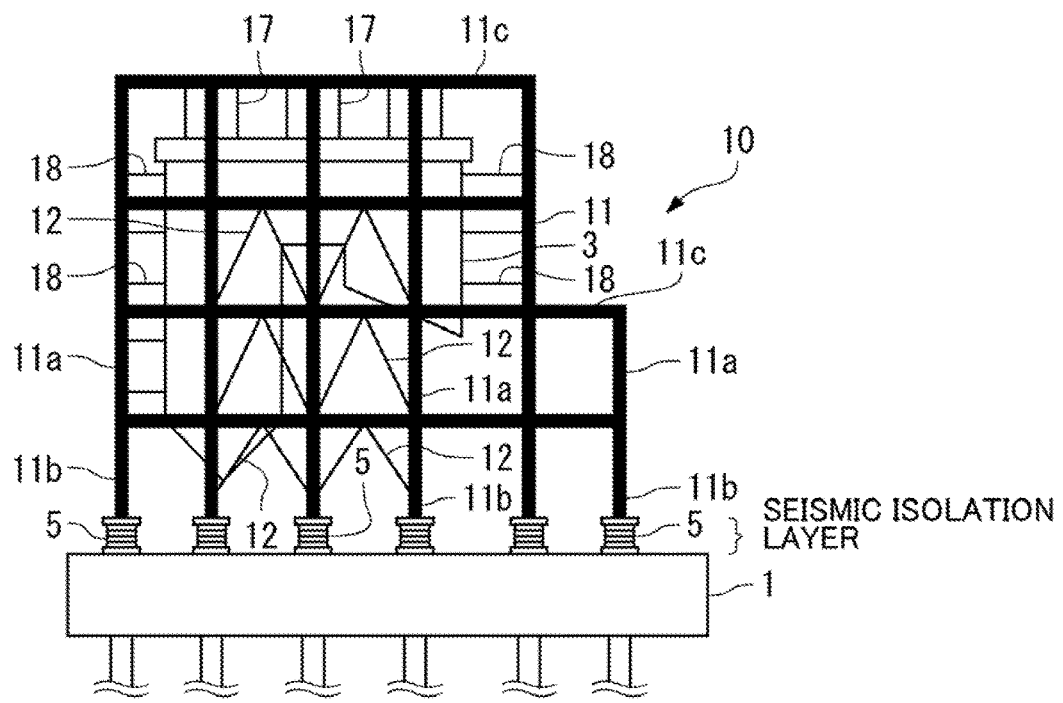
FIG. 1 is a side view showing a boiler support structure according to a first embodiment.

As shown in FIG. 1, a boiler support structure 10 according to this embodiment is provided on a foundation 1. The boiler support structure 10 includes, as main components, a support steel frame 11 and a plurality of seismic isolators 5 supporting the support steel frame 11, and supports a boiler main body (object to be supported) 3.

The support steel frame 11 is formed by combining a plurality of columns 11a extending in a vertical direction, a plurality of beams 11c extending in a horizontal direction, and a plurality of vertical braces 12. The boiler support structure 10 is erected on the foundation 1 through column bases 11b that are end portions of the columns 11a of the support steel frame 11.

In the boiler support structure 10, the boiler main body 3 is suspended from a top part of the support steel frame 11 through a plurality of suspension bars 17, which are fixed to the uppermost beam 11c, so as not to be restrained from thermal expansion during operation. To restrict a horizontal shift of the boiler main body 3, the boiler support structure 10 has supports 18 that are each interposed in the horizontal direction across (between) the boiler main body 3 and the column 11a located on an outermost peripheral part of the support steel frame 11.

As shown in FIG. 1, in the boiler support structure 10, the seismic isolator 5 is installed between a bottom of each column base 11b and the foundation 1. In some cases, one seismic isolator 5 may support a plurality of column bases 11b.

In the boiler support structure 10, the seismic isolation characteristics of each seismic isolator 5 are set according to a horizontal reactive force that occurs on the column base 11b as an earthquake force acts on the support steel frame 11 (hereinafter referred to simply as a column base reactive force), and are set so that all the seismic isolators 5 behave synchronously.

Figure 2A:
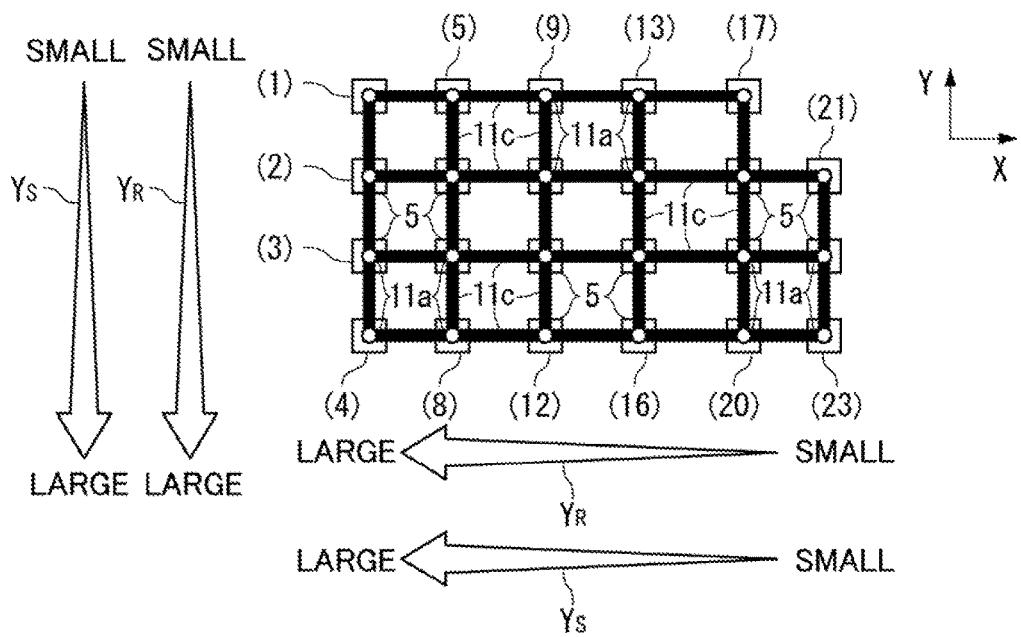
FIG. 2A is a lateral sectional view of the support structure of FIG. 1.

Specifically, as shown in FIG. 2A, a seismic isolator 5 with high rigidity $Y_S$ is installed at a location where a column base reactive force $Y_R$ is large, and a seismic isolator 5 with low rigidity $Y_S$ is installed at a location where the column base reactive force $Y_R$ is small. FIG. 2A shows correspondence between the column base reactive force $Y_R$ and the rigidity $Y_S$ of the seismic isolators 5 in a Y-axis direction in this drawing. As indicated by the arrows in FIG. 2A, it is set so that the column base reactive force $Y_R$ of the column bases 11b increases from one side toward the other side, and so that the rigidity $Y_S$ of the seismic isolators 5 increases accordingly. As shown in FIG. 2A, the seismic isolators 5 are numbered (1), (2), (3) . . . (23) from the upper left one to identify their respective positions.

In this embodiment, for the signs of loads, a pullout force and a compressive force are respectively defined as positive (+) and negative (−).

The reason why the seismic isolators 5 are thus differentiated in rigidity from one another will be described.

The boiler support steel frame 11 is characterized in that the column base reactive force varies significantly according to the position of the column base 11b. This is because the boiler support structure 10 including the boiler main body 3 has anisotropy relative to a horizontal load. Therefore, if the seismic isolators 5 with the same rigidity are installed at the column bases 11b, these seismic isolators 5 would shift differently, making it impossible to achieve a stable vibration mode after seismic isolation. Specifically, if a variation occurs in magnitude of the column base reactive force among the column bases 11b as shown in FIG. 2A, a torsional vibration mode may occur as the seismic isolators 5 at locations where the column base reactive force is large undergo large deformation, while the seismic isolators 5 at locations where the column base reactive force is small undergo small deformation.

Therefore, if the rigidity $Y_S$ of the seismic isolators 5 supporting the column bases 11b is adjusted according to the magnitude of the column base reactive force $Y_R$ as shown in FIG. 2A, the amounts of shift of the seismic isolators 5 at the column bases 11b can be matched. As a result, the boiler support structure 10 can vibrate integrally in the event of an earthquake, which enhances the seismic isolation effect.

As the seismic isolator 5 used in this embodiment, any one of laminated rubber bearing-type, sliding bearing-type, and rolling bearing-type seismic isolators can be employed.

Now, a procedure of efficiently identifying the position where the pullout countermeasure is to be provided in the boiler support structure 10 having the above-described configuration will be described with reference to FIG. 2A to FIG. 4C. The following procedure can be executed by computer simulation. For the signs of the loads in FIG. 2A to FIG. 4C, the signs + and − are respectively defined as a pullout force and a compressive force. A suffix n (1 to 23) is the number identifying the seismic isolators 5.

[Identification of Position where Pullout Countermeasure is to be Provided]

(A) Temporary Arrangement of Seismic Isolators 5

All the seismic isolators 5, which are laminated rubber bearings, are temporarily arranged. This arrangement is as shown in FIG. 1 and FIG. 2A.

(B) Calculation of Compressive Load $N_{Dn}$

Figure 2B:
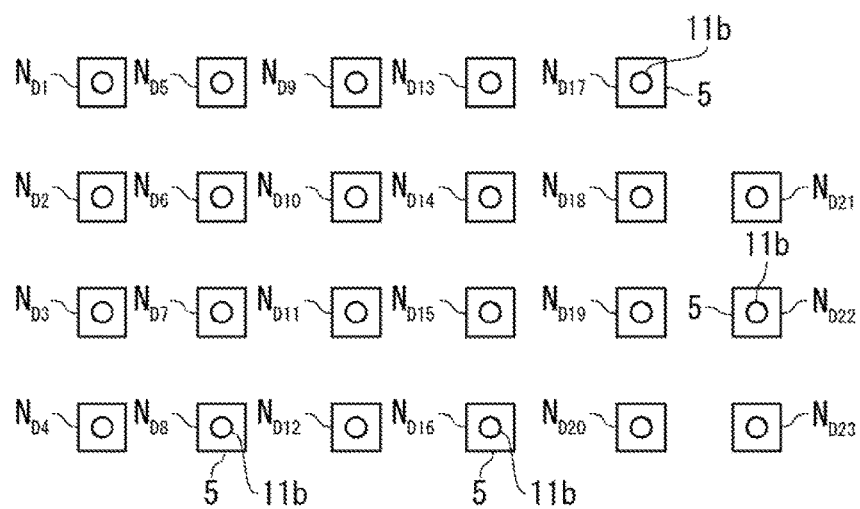
FIG. 2B is a view showing an arrangement of seismic isolators and a compressive load thereon in the support structure of FIG. 1.

Next, a compressive load $N_{Dn}$ ($N_{Dn}<0$) occurring on each seismic isolator 5 due to a permanent load imposed on the boiler support structure 10 is calculated by a static analysis (FIG. 2B). Due to a considerable distribution in the horizontal direction of this permanent load, which is composed mainly of the loads of the boiler main body 3 and the support steel frame 11 that are a superstructure of the boiler support structure 10, a considerable variation occurs in the compressive load $N_{Dn}$ on the seismic isolators 5.

(C) Calculation of Pullout Force $N_{EQn}$

A pullout force $N_{EQn}$ ($N_{EQn}>0$) occurring on each seismic isolator 5 when an earthquake occurs is calculated. This calculation is performed, for example, by a pullout force calculation procedure described below.

(D) Calculation of Allowable Pullout Force $N_{tn}$

Using an allowable pullout stress of a laminated rubber bearing (seismic isolation element) part of each seismic isolator 5, an allowable pullout force $N_{tn}$ (N) ($N_{tn}>0$) of the seismic isolation element is calculated. For example, if the allowable pullout stress of the seismic isolation element is 1 N/mm², the allowable pullout force $N_{tn}$ can be calculated using the following Formula (5):

$$N_{tn} = 1 \times A \qquad \text{Formula (5)},$$

where A is an effective sectional area (mm²) of the laminated rubber bearing.

(E) Evaluation of Whether Pullout Countermeasure is Required

Each seismic isolator 5 is evaluated as to whether a pullout countermeasure is required using the following Formula (1), and those seismic isolators 5 that satisfy Formula (1) are provided with the pullout countermeasure.

Figure 3A:
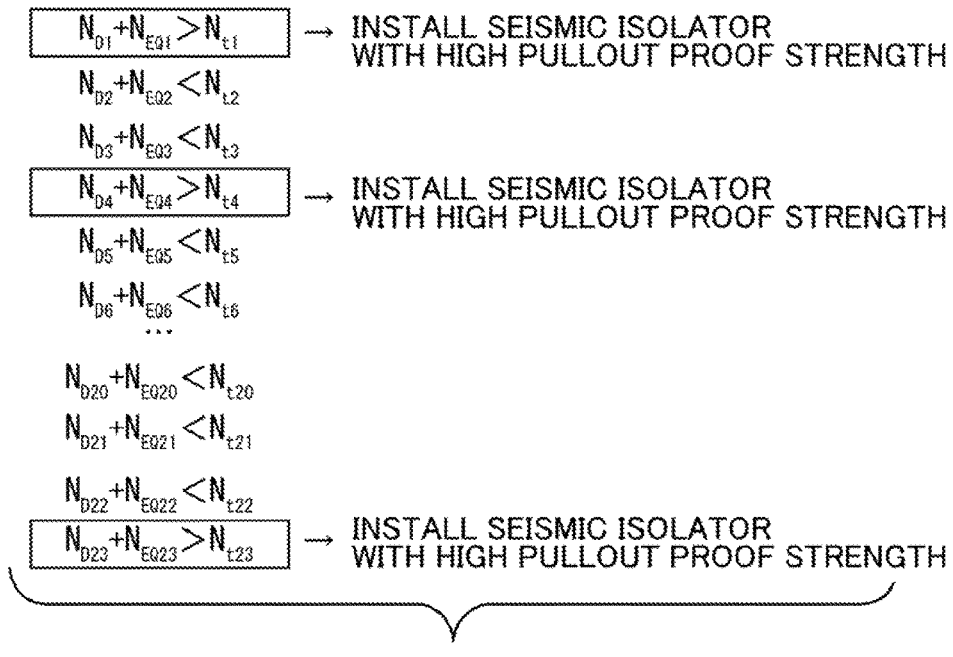
FIGS. 3A and 3B are views showing a procedure of determining whether to provide a pullout countermeasure.
Figure 3B:
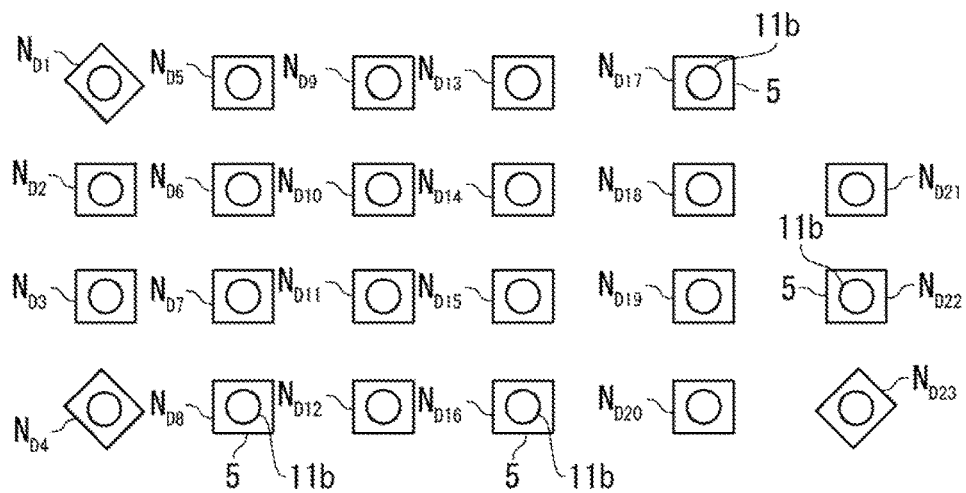

If the seismic isolators 5 Nos. (1), (4), and (23) among the seismic isolators 5 Nos. (1) to (23) satisfy Formula (1) as shown in FIG. 3A, the seismic isolators 5 Nos. (1), (4), and (23) are provided with the pullout countermeasure as shown in FIG. 3B. Here, the specific means of the pullout countermeasure is not limited as long as a predetermined pullout proof strength is provided and the seismic isolation performance is not inhibited. For example, a linear-motion rolling bearing, a laminated rubber bearing equipped with a pullout prevention mechanism, etc. can be employed.

$$N_{Dn} + N_{EQn} > N_{tn} \qquad \text{Formula (1)}$$

[Pullout Force Calculation Procedure]

For example, the pullout force $N_{EQn}$ ($N_{EQn}>0$) in the event of an earthquake can be calculated by the following procedure.

(a) Calculation of Response Acceleration Sa of Superstructure

Figure 4A:
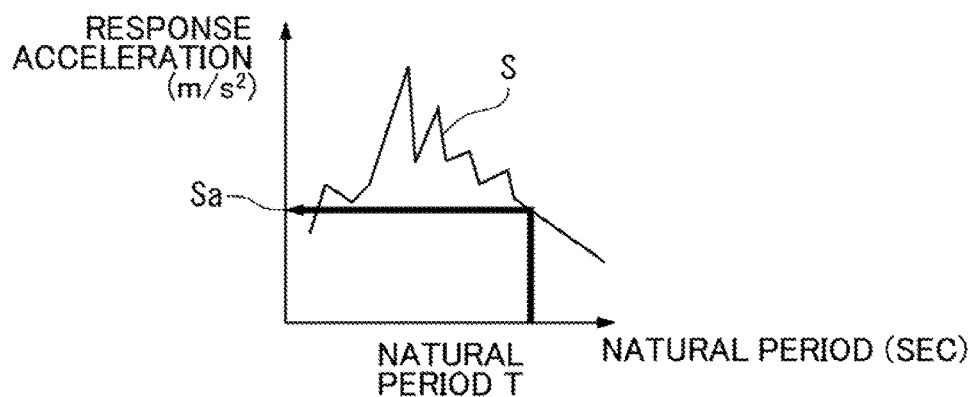
FIGS. 4A to 4C are views showing a pullout force calculation procedure.

From a response spectrum S of a design earthquake wave, a response acceleration Sa of the superstructure in a primary natural period T of a seismic isolation structure, here the boiler support structure 10, is calculated. FIG. 4A conceptually shows this calculation method.

(b) Calculation of Horizontal Force P on Superstructure

Figure 4B:
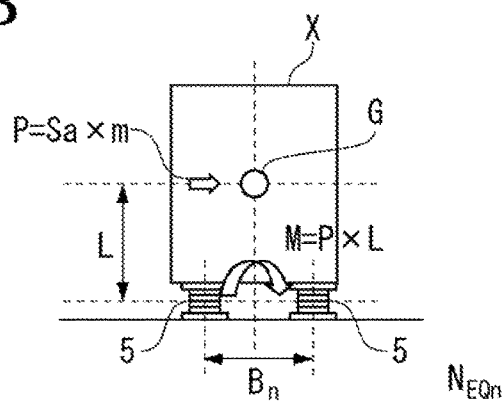

Using the calculated response acceleration Sa, a horizontal force P on the superstructure is calculated by the following Formula (3). As shown in FIG. 4B, the horizontal force P is assumed to act at a center of gravity G of a superstructure X:

$$P = Sa \times m \quad \text{Formula (3)},$$

where m is a mass of the superstructure.

(c) Calculation of Overturning Moment M on Seismic Isolation Layer

Using the calculated horizontal force P, an overturning moment M occurring on the seismic isolation layer when the horizontal force P is exerted at the center of gravity G of the superstructure X is calculated by Formula (4) (see FIG. 4B). Here, the seismic isolation layer refers to a region that is located between the foundation 1 and the support steel frame 11 and occupied by the seismic isolators 5. In other words, the seismic isolation layer represents a story which is located between the superstructure and the foundation and in which the seismic isolators are provided.

$$M = P \times L \quad \text{Formula (4)}$$

In Formula (4), L is a distance in the vertical direction from the center of gravity G of the superstructure X to the center of the seismic isolation layer (seismic isolator 5) in a height direction.

(d) Calculation of Pullout Force $N_{EQn}$ on Seismic Isolator 5

Figure 4C:
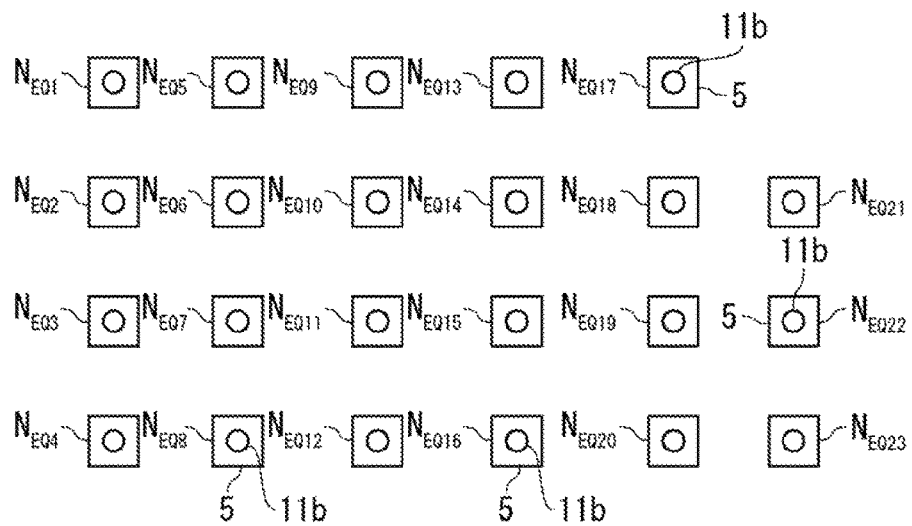

Using the calculated overturning moment M, the pullout force $N_{EQn}$ on each seismic isolator 5 is calculated by Formula (2) (FIG. 4C).

$$N_{EQn} = M/B_n \quad \text{Formula (2)}$$

In Formula (2), $B_n$ is a length of an arm of the overturning moment on each seismic isolator 5 (see FIG. 4B).

Here, as shown in FIG. 4B, Formula (2) assumes two seismic isolators 5, and is based on the premise that these seismic isolators 5 have the same vertical rigidity. If the seismic isolators 5 vary in vertical rigidity, the pullout force $N_{EQn}$ on each seismic isolator 5 can be obtained so as to satisfy the following Formula (6) by obtaining a neutral axis (rotational center) from a balance of the vertical rigidity:

$$N_{EQn} = M/Cn \quad \text{Formula (6)}$$

In Formula (6), Cn is a distance of the seismic isolator n from the neutral axis.

Effects of First Embodiment

This embodiment has the following effects.

In the boiler support structure 10, the seismic isolators 5 on which the pullout force becomes excessive are identified. Thus, only those seismic isolators 5 at the identified locations can be provided with the pullout countermeasure, so that the number of the seismic isolators 5 to be provided with the pullout countermeasure can be reduced.

If provided with the pullout countermeasure, the seismic isolator 5 becomes more costly than a common seismic isolator 5 such as a laminated rubber bearing. According to this embodiment, however, the number of the seismic isolators 5 to be provided with the pullout countermeasure can be reduced, so that a seismic isolation structure can be realized at lower cost.

This embodiment requires simply combining a common seismic isolator 5, which is a laminated rubber bearing, with the pullout countermeasure, so that it is possible to realize an efficient seismic isolation structure without the need for changing the framework plan for the superstructure or installing a special seismic isolator.

It is a common practice to conduct an earthquake response analysis when calculating a pullout force occurring on a seismic isolator 5. According to the technique of this embodiment, however, a pullout force occurring on a seismic isolator is calculated simply by using a response acceleration of the superstructure. Thus, it is possible to save the time and effort involved in conducting an earthquake response analysis, and this embodiment can significantly reduce the design man-hours.

Second Embodiment

Figure 5A:
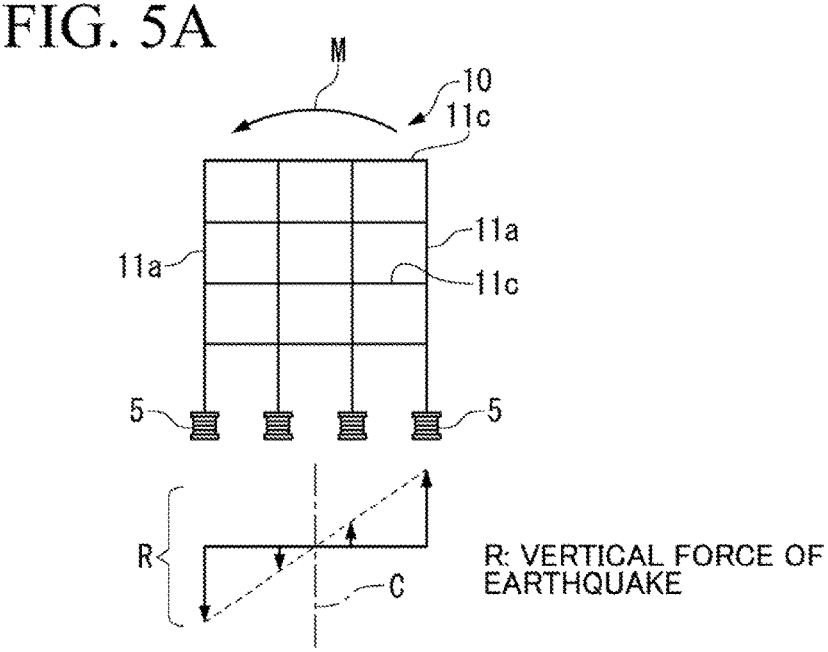
FIGS. 5A to 5C are views showing a second embodiment.
Figure 5B:
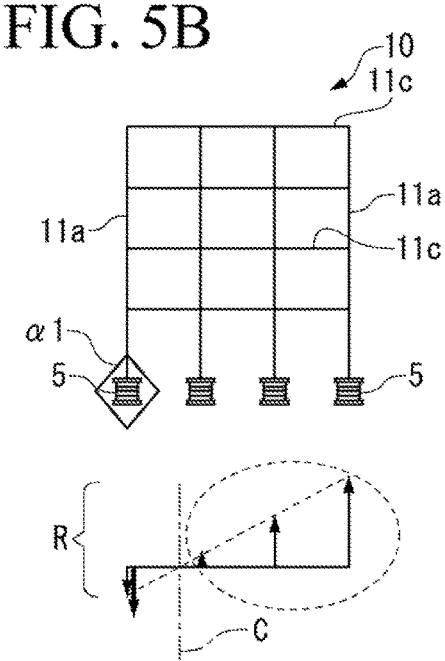

Next, a second embodiment of the present invention will be described. The second embodiment proposes a technique of providing the pullout countermeasure so that the neutral axis (rotational center around a horizontal axis) of the seismic isolation layer does not shift. This technique will be described below with reference to FIGS. 5A to 5C. FIG. 5A shows a distribution of the vertical force R on the seismic isolation layer when an earthquake load is applied to the boiler support structure 10 that is not provided with a pullout countermeasure. A neutral axis C is located at the center of the boiler support structure 10 in a width direction (left-right direction in FIG. 5A). As shown in FIG. 5B, if a pullout countermeasure α1 is provided for the seismic isolator 5 at the left end in this drawing, as the neutral axis C moves toward a side where the rigidity is higher, the neutral axis C moves to the left side from the original position before the pullout countermeasure is provided. Then, the vertical force occurring on the right side of the neutral axis C may increase from that before the pullout countermeasure is provided. In the second embodiment, therefore, the pullout countermeasure is provided so that the neutral axis C of the seismic isolation layer does not shift from the position before the pullout countermeasure is provided.

To provide the pullout countermeasure without causing a shift of the neutral axis C, any one of the following techniques (1) to (3) can be used:

(1) Install a pullout countermeasure, which is the same as a pullout countermeasure already installed, symmetrically with respect to the neutral axis C.

Figure 5C:
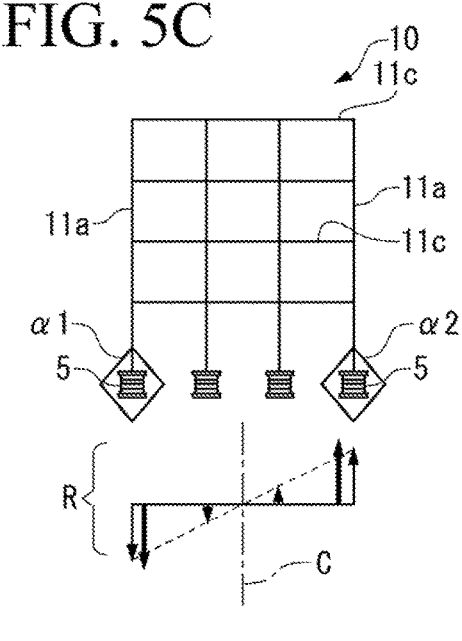

For example, if the pullout countermeasure α1 is provided as shown in FIG. 5B, a pullout countermeasure α2 is installed at a position symmetrical with the pullout countermeasure α1 with respect to the original neutral axis C as shown in FIG. 5C. Thus, the neutral axis C does not shift from the original position, so that the pullout force does not increase from the original force.

(2) Calculate the rotational rigidity around the neutral axis C ((vertical rigidity of pullout countermeasure) x (length of arm from rotational center)) of a pullout countermeasure already installed, and install a pullout countermeasure similar in rotational rigidity on the opposite side across the neutral axis.

(3) Calculate the rotational rigidity around the neutral axis (total of (vertical rigidity of pullout countermeasure)× (length of arm from rotational center)) of a plurality of pullout countermeasures already installed, and install pullout countermeasures similar in rotational rigidity on the opposite side across the neutral axis. One or a plurality of countermeasures may be installed on the opposite side.

In the above techniques (1) to (3), instead of installing new pullout countermeasures, pullout countermeasures that are planned to be installed may be used. For example, in the example of FIGS. 5A to 5C, in the case where the pullout countermeasure α2 is originally intended to be provided for the second column 11a from the right in the drawing, the installation position can be changed to the column 11a at the right end as shown in FIG. 5C. Or, in the case where a pullout countermeasure is originally planned to be installed at the column 11a at the right end, pullout countermeasures of the same specifications can be provided at the right end and the left end so that the neutral axis does not move.

Effects of Second Embodiment

According to the second embodiment, the pullout countermeasures equivalent in rotational rigidity around the neutral axis C are provided around the neutral axis C. Thus, without the position of the neutral axis C moving due to the pullout countermeasures, it is easy to consider the installation of the pullout countermeasures.

Moreover, in this case, it is possible to provide the pullout countermeasures more efficiently by using other pullout countermeasures that are planned to be installed.

Third Embodiment

Next, a third embodiment of the present invention will be described. In contrast to the second embodiment, the third embodiment proposes moving the position of the neutral axis of the seismic isolation layer by providing the pullout countermeasure. This will be described below with reference to FIGS. 6A to 6D.

Figure 6A:
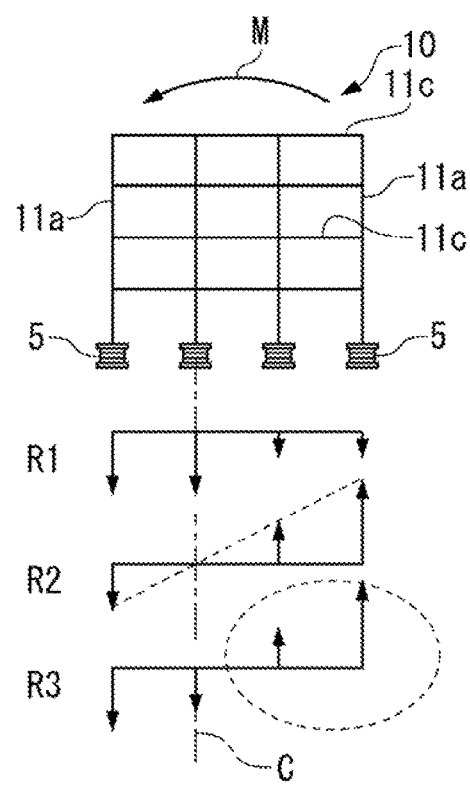
Figure 6B:
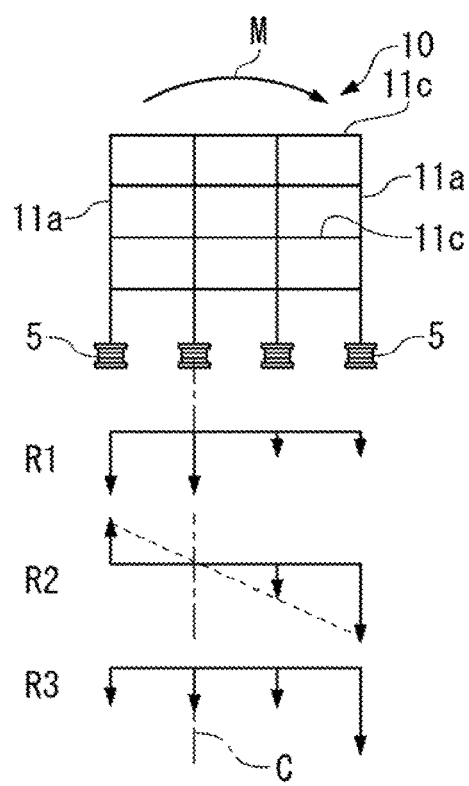

For example, as shown in FIGS. 6A and 6B, it is assumed that the neutral axis C is shifted toward the left side in the drawings from the center in the width direction (left-right direction in the drawings). However, it is assumed that the overturning moment M in a counterclockwise direction acts in FIG. 6A, and that the overturning moment M in a clockwise direction acts in FIG. 6B. In the case of FIG. 6A, the two seismic isolators 5 corresponding to the positions where a vertical force R3 is circled by the broken line need to be provided with the pullout countermeasure. On the basis of this premise, the seismic isolators 5 to be provided with the pullout countermeasure are considered.

The gist of this embodiment is to provide the pullout countermeasure so that the neutral axis C moves to a side where the compressive force of the permanent load is smaller, since the pullout force of an earthquake tends to be smaller at a position closer to the rotational center (neutral axis C) in the vertical direction, and conversely the pullout force of an earthquake tends to be larger at a position farther from the neutral axis C.

For example, if the pullout countermeasure α1 is provided in accordance with FIGS. 6A and 6B, only the seismic isolator 5 at the right end in the drawings is provided with the pullout countermeasure as shown in FIGS. 6C and 6D. Thus, the neutral axis C can be moved to the center in the width direction, so that it is not necessary to provide two seismic isolators 5 with the pullout countermeasure.

Effects of Third Embodiment

According to the third embodiment, adjusting the position of the neutral axis C can reduce the pullout load in the event of an earthquake in a part where the permanent load is smaller, and can thus reduce the number of positions where the pullout countermeasure is to be provided, so that the pullout countermeasures can be provided more efficiently.

Fourth Embodiment

Next, a fourth embodiment of the present invention will be described. The fourth embodiment proposes installing a tie beam as a member that transfers a vertical force in the boiler support structure 10 in which the pullout countermeasure is installed according to any one of the first to third embodiments. This will be described below with reference to FIGS. 7A to 7C.

Figure 7A:
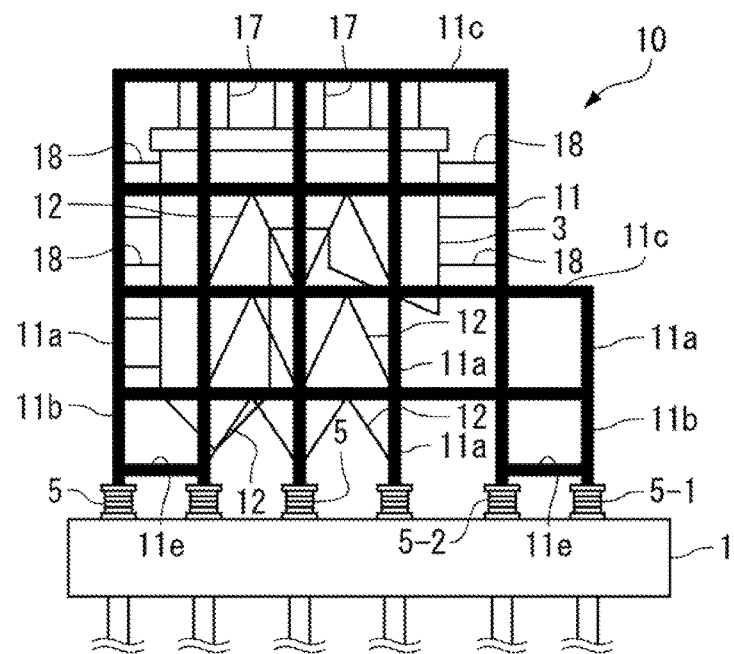
FIGS. 7A to 7C are views showing a fourth embodiment.

As shown in FIG. 7A, the basic configuration of the boiler support structure 10 according to the fourth embodiment is based on that of the above boiler support structure 10, but it is assumed that a pullout force occurring on a seismic isolator 5-1 is large while a pullout force occurring on an adjacent seismic isolator 5-2 is sufficiently small relative to the pullout proof strength. This is because otherwise the pullout force on the seismic isolator 5-2 increases beyond the pullout proof strength as the pullout force on the seismic isolator 5-1 is distributed to the seismic isolator 5-2, which may make it necessary to provide the pullout countermeasure for the seismic isolator 5-2, too.

Figure 7B:
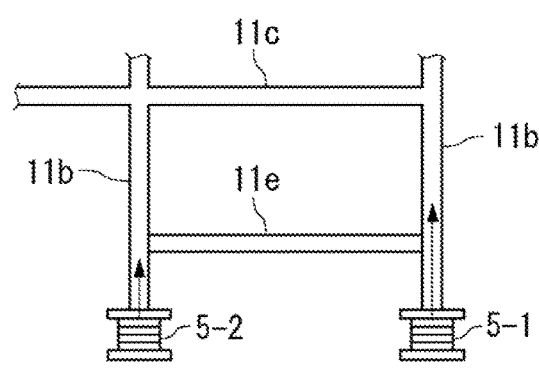

As shown in FIGS. 7A and 7B, in the boiler support structure 10, the column 11a (column base 11b) supported by the seismic isolator 5-1 and the column 11a (column base 11b) supported by the seismic isolator 5-2 are coupled together by a tie beam 11e.

Effects of Fourth Embodiment

According to the boiler support structure 10 configured as has been described above, as the large pullout force occurring on the seismic isolator 5-1 is distributed to another adjacent seismic isolator 5-2 through the tie beam 11c and the adjacent columns 11a, the pullout force occurring on the seismic isolator 5-1 is reduced. Thus, it is not necessary to provide the seismic isolator 5-1 with the pullout countermeasure, so that the number of the seismic isolators 5 to be provided with the pullout countermeasure can be reduced. Alternatively, as the pullout proof strength required of the pullout countermeasure applied to the seismic isolator 5-1 is reduced, the pullout countermeasure applied to the seismic isolator 5-1 can be changed to a simpler, less expensive one.

According to the boiler support structure 10, disposing the tie beam 11e can secure the horizontal rigidity of the part which is located above the seismic isolation layer. Thus, a vibration mode in which the entire superstructure which is located above the seismic isolation layer vibrates integrally can be more easily achieved, and the seismic isolation effect can be enhanced.

Figure 7C:
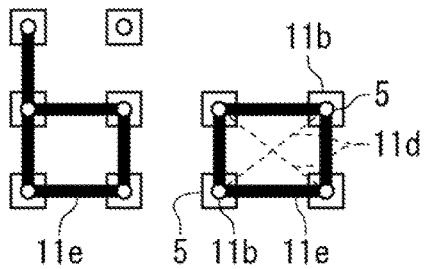

While only the tie beam 11e is provided in the example shown above, if the vertical rigidity is insufficient, horizontal braces 11d may be provided as shown in FIG. 7C.

In this embodiment, the tie beam 11e and the horizontal brace 11d are members that transfer a vertical force, and therefore the column 11a (column base 11b) is rigidly connected to the tie beam 11e and the horizontal brace 11d.

Figure 8:
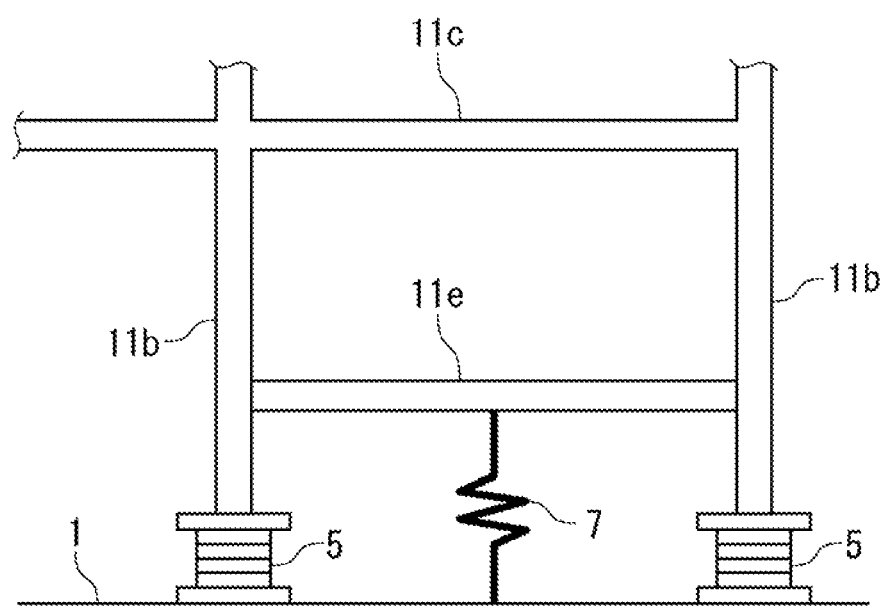
FIG. 8 is a view showing a modified example of the fourth embodiment.

In the fourth embodiment, as shown in FIG. 8, a pullout prevention mechanism 7 can be installed to the tie beam 11e in parallel to the seismic isolators 5. The pullout prevention mechanism 7 is coupled at one end to the tie beam 11e and at the other end to the foundation 1.

The pullout prevention mechanism 7 has higher vertical rigidity than the seismic isolator 5, and can follow a horizontal shift of the seismic isolator 5. For example, a coupling part between the pullout prevention mechanism 7 and the tie beam 11e and a coupling part between the pullout prevention mechanism 7 and the foundation 1 can be supported by pins or by linear sliders.

Thus providing the pullout prevention mechanism 7 can cause the pullout force in the event of an earthquake to concentrate at the pullout prevention mechanism 7 having high vertical rigidity, so that the pullout force imposed on the seismic isolator 5 can be reduced accordingly. Compared with if only the tie beam 11e and the horizontal brace 11d are provided, therefore, the pullout force occurring on the seismic isolator 5 can be reduced. As a result, the number of the seismic isolators 5 to be provided with the pullout countermeasure can be further reduced.

Fifth Embodiment

Next, a fifth embodiment of the present invention will be described. The fifth embodiment proposes installing an RC (reinforced-concrete) slab 15 as shown in FIGS. 9A and 9B as substitute for the tie beam 11e of the fourth embodiment.

The slabs 15 are installed between the column bases 11b, 11b . . . without a horizontal clearance, and a vertical force is transferred among the column bases 11b, 11b . . . through the slabs 15.

Figure 9A:
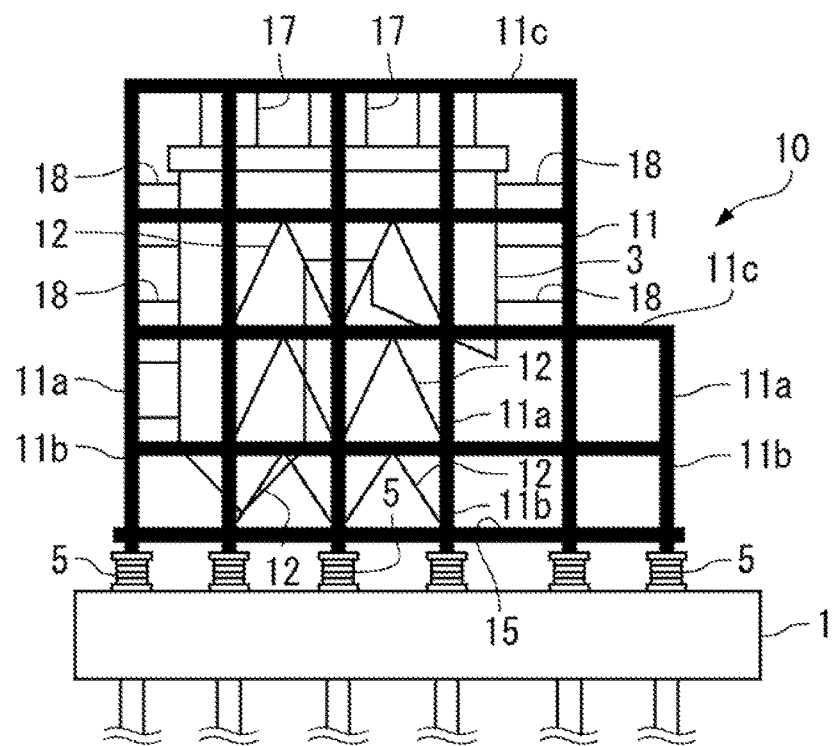
FIGS. 9A and 9B are views showing a fifth embodiment.
Figure 9B:
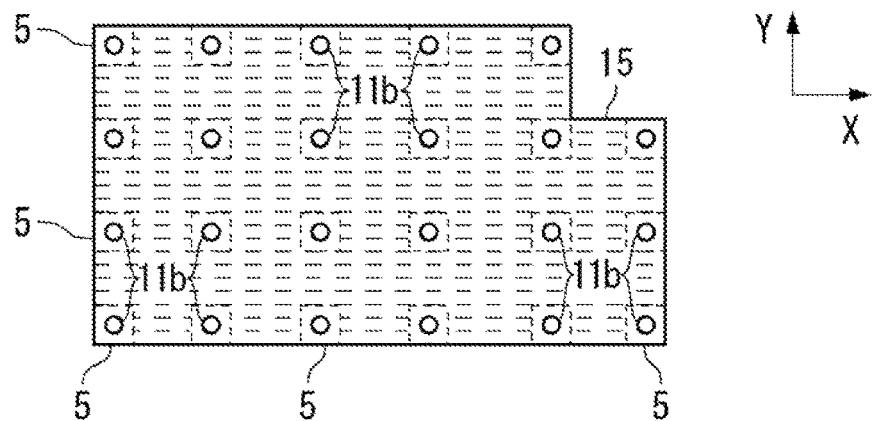

In the example shown in FIGS. 9A and 9B, the slabs 15 are installed between all the adjacent column bases 11b, but the slabs 15 can also be disposed only at locations where a vertical force needs to be transferred.

Effects of Fifth Embodiment

The slab 15 is heavier than the tie beam 11e of the fourth embodiment. According to the fifth embodiment, therefore, the compressive load $N_D$ (<0) due to the permanent load acting on the seismic isolators 5 is smaller than in the fourth embodiment. As the compressive load $N_D$ becomes smaller, the number of the seismic isolators 5 satisfying Formula (1) ($N_D+N_{EQ}>N_t$) shown in the first embodiment becomes smaller, and thus the number of the seismic isolators 5 to be provided with the pullout countermeasure can be reduced.

Since the vertical rigidity of the superstructure is higher than in the fourth embodiment and the pullout force at locations where the pullout force occurring on the seismic isolator 5 is large is distributed to a larger number of the other seismic isolators 5 than in the fourth embodiment, the pullout force at the locations where the pullout force is large is further reduced. Thus, it is possible to reduce the number of the seismic isolators 5 to be provided with the pullout countermeasure from that in the fourth embodiment.

In the boiler support structure 10, the pullout force occurring on the seismic isolators 5 tends to vary according to the position of the column base 11b. If the load occurring on the seismic isolators 5 varies, it is necessary to dispose the seismic isolators 5 of different specifications according to the installation position. This may lead to a cost increase, as the seismic isolators cannot be collectively procured based on the same specifications. However, if the fifth embodiment is adopted, the load occurring on the seismic isolators 5 can be evened out, which makes it possible to dispose the seismic isolators 5 of the uniform specifications regardless of the position of the column base 11b, and thus contributes to a cost reduction of the seismic isolators 5.

Modified Example of Fifth Embodiment

Figure 10A:
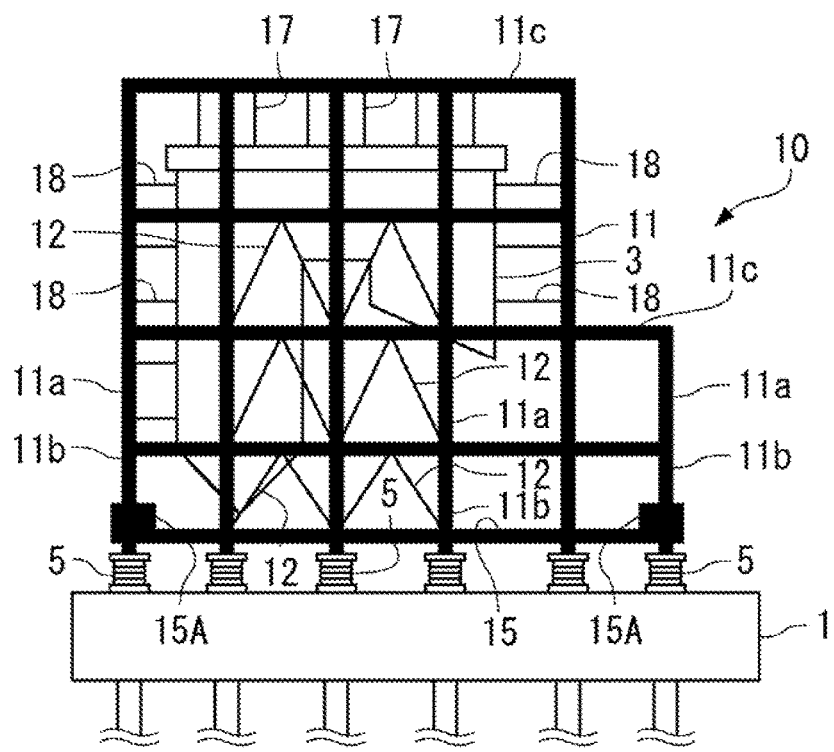
FIGS. 10A and 10B are views showing a modified example of the fifth embodiment.
Figure 10B:
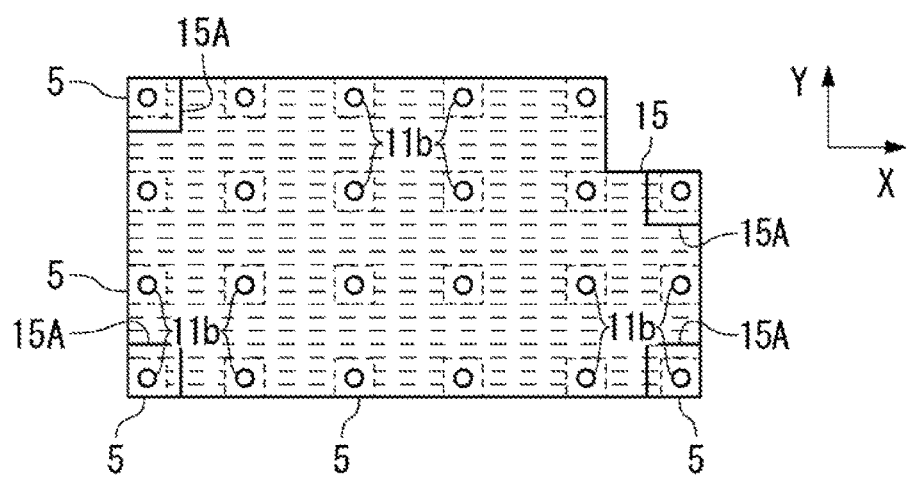

In the fifth embodiment, as shown in FIGS. 10A and 10B, thick parts 15A that are thicker than other parts are provided in the slabs 15 located directly above the seismic isolators 5 subjected to a large pullout force.

Thus, the compressive load $N_D$ (<0) due to the permanent load acting on the seismic isolators 5 located directly below the thick parts 15A can be reduced compared with that in the fifth embodiment described above. As $N_D$ becomes smaller, the number of the seismic isolators 5 satisfying Formula (1) ($N_D+N_{EQ}>N_t$) shown in the first embodiment decreases, so that the number of the seismic isolators 5 to be provided with the pullout countermeasure can be further reduced.

Figure 11A:
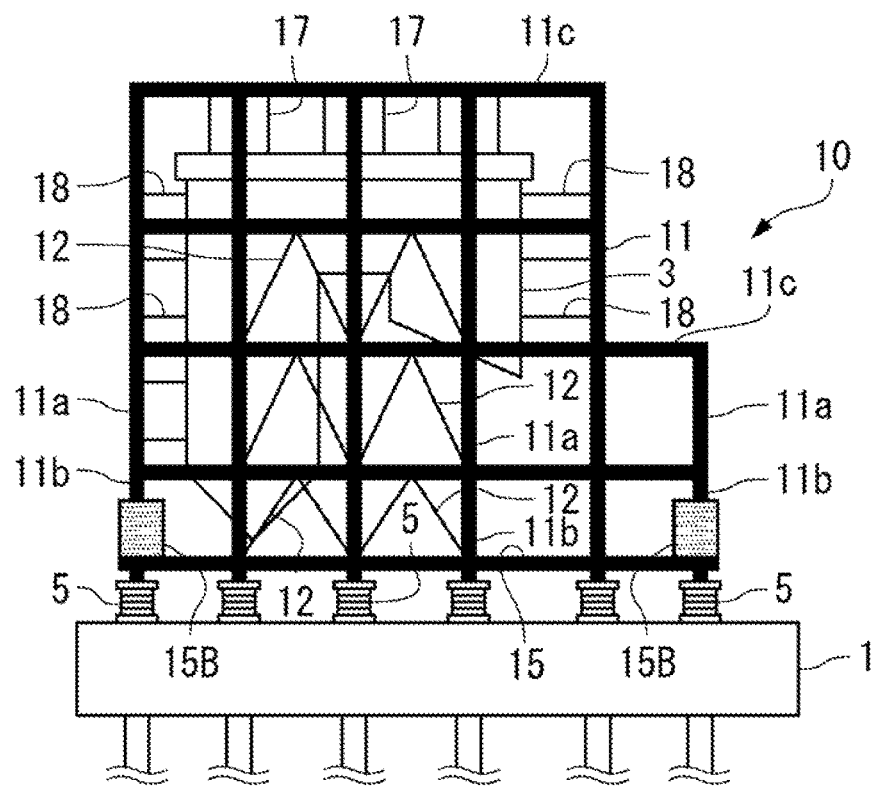
FIGS. 11A and 11B are views showing another modified example of the fifth embodiment.
Figure 11B:
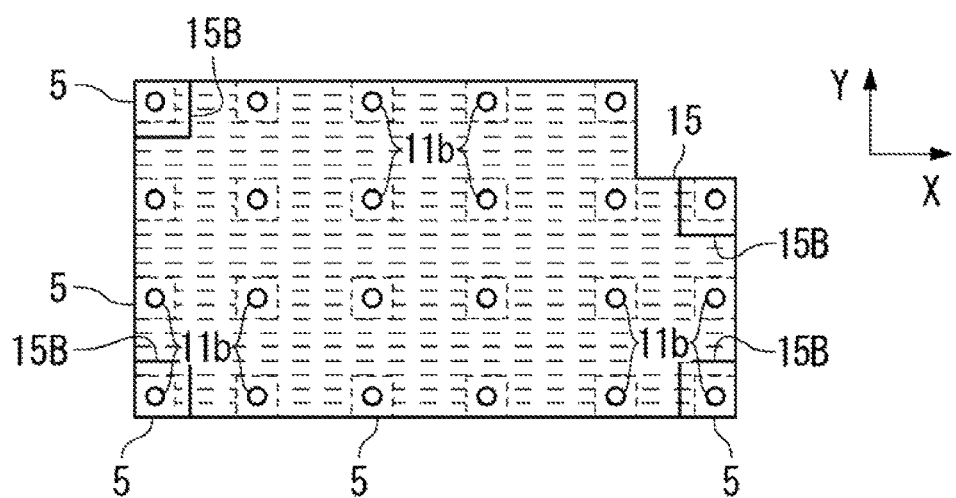

In the case where the slab 15 is provided, as shown in FIGS. 11A and 11B, it is also preferable that equipment 15B (duct, pipe foundation, etc.) be installed on the RC slabs located directly above the seismic isolators 5 subjected to a large pullout force.

Thus, the compressive load $N_D$ (<0) due to the permanent load acting on the seismic isolators 5 located directly below the installation positions of the equipment can be further reduced. As $N_D$ becomes smaller, the number of the seismic isolators 5 satisfying Formula (1) ($N_D+N_{EQ}>N_t$) shown in the first embodiment decreases, so that the number of the seismic isolators 5 to be provided with the pullout countermeasure can be further reduced.

While the embodiments of the present invention have been described above, the components presented in the above embodiments can be selectively adopted or appropriately changed into other components within the scope of the gist of the present invention.

In the embodiments having been described above, the seismic isolators 5 are provided between the foundation 1 and the column bases 11b of the columns 11a (hereinafter a "first form"). However, the positions where the seismic isolators 5 are provided may be an intermediate region in the height direction of the support steel frame (hereinafter a "second form"), or be a top part of the support steel frame (hereinafter a "third form").

According to the first form, it is possible to seismically isolate the entire boiler main body and the support structure that is located above the seismic isolators 5, and to significantly reduce an earthquake force acting on the support steel frame. Moreover, the support structure is allowed to vibrate integrally in the event of an earthquake, which contributes to improving the seismic isolation effect.

To describe the second form, the support structure supporting the boiler main body is a top-heavy structure, with the load to be supported tending to be larger in upper stories. Therefore, the second form in which only the upper stories are seismically isolated by providing intermediate seismic isolators can also achieve a sufficient earthquake force reducing effect.

Moreover, providing a seismic isolator at a position higher than the column base can reduce a length h of an arm of the overturning moment M on the seismic isolator due to an inertial force occurring in the event of an earthquake. Thus, a tensile force occurring on the seismic isolator is reduced, so that the seismic isolator can be employed in a support structure of a boiler such as a large boiler that is subjected to a large overturning moment M in the event of an earthquake.

Next, to describe the third form, the support steel frame supports the boiler main body that is suspended from the top part. Installing a seismic isolator at the top part can reduce the inertial force of the boiler main body acting on the support steel frame in the event of an earthquake. In particular, if the boiler support structure is not provided with the support, the inertial force of the boiler main body is entirely transferred to the support steel frame through a part located above the seismic isolator. Therefore, seismically isolating the top part in the third form can reduce the inertial force of the boiler main body transferred to the support steel frame, and can thus reduce the earthquake load acting on the support steel frame.

Moreover, in the third form, the position of the seismic isolator is even higher and the length h of the arm is shorter than in the second form, so that the overturning moment M occurring on the seismic isolator in the event of an earthquake is further reduced. Thus, it is possible to employ the seismic isolator in a support steel frame that is subjected to an extremely large overturning moment M.

While the structure supporting a boiler has been described above as an example of the support structure, the present invention is not limited to this example and is widely applicable to support structures in which a considerable distribution of the magnitude of a horizontal load can occur.

REFERENCE SIGNS LIST

1 Foundation
3 Boiler main body (object to be supported)
5 Seismic isolator
7 Prevention mechanism
10 Boiler support structure
11 Support steel frame
11a Column
11b Column base
11c Beam
11d Horizontal brace
11e Tie beam
12 Vertical brace
15 Slab
15A Thick part
15B Equipment
17 Suspension bar
18 Support
C Neutral axis
G Center of gravity
M Overturning moment

The invention claimed is:

1. A boiler support structure comprising:
a boiler main body;
a boiler support steel frame supporting the boiler main body in a suspended state, the boiler support steel frame comprising column bases, a plurality of columns erected on a foundation via the column bases, and a plurality of beams connecting adjacent columns to each other; and
a plurality of seismic isolators supporting at least one of the columns, the seismic isolators being provided on the foundation, wherein each of the seismic isolators that satisfy the following Formula (1) is provided with a pullout countermeasure:

$$N_{Dn} + N_{EQn} > N_{tn} \qquad \text{Formula (1)},$$

wherein $N_{Dn}$, $N_{EQn}$, and $N_{tn}$ are defined as follows:
$N_{Dn}$ ($N_{Dn} < 0$) is a compressive load occurring on each of the seismic isolators and calculated on the basis of a permanent load imposed on the boiler support structure;
$N_{EQn}$ ($N_{EQn} > 0$) is a pullout force occurring on each of the seismic isolators and calculated on the assumption that an earthquake has occurred; and
$N_{tn}$ ($N_{tn} > 0$) is an allowable pullout force of each of the seismic isolators and calculated using an allowable pullout stress of the seismic isolator.

2. The boiler support structure according to claim 1, wherein the pullout force $N_{EQn}$ is calculated on the basis of the following Formula (2):

$$N_{EQn} = M/B_n \qquad \text{Formula (2)},$$

wherein M and $B_n$ of Formula (2) are defined as follows:
M is an overturning moment occurring on a seismic isolation layer when a horizontal force P acts at a center of gravity G of a superstructure and calculated on the basis of the following Formulae (3) and (4), the superstructure being a part of the structure located above the seismic isolation layer; and
$B_n$ is a length of an arm of the overturning moment M on each of the seismic isolators, $$P = Sa \times m \qquad \text{Formula (3)},$$

$$M = P \times L \qquad \text{Formula (4)},$$

wherein Sa, m, P, and L of Formulae (3) and (4) are defined as follows:
Sa is a response acceleration in a natural period T of the superstructure and calculated from a response spectrum of a design earthquake wave;
m is a mass of the superstructure;
P is a horizontal force on the superstructure; and
L is a distance in a vertical direction from the center of gravity G of the superstructure to the center of the seismic isolation layer in a height direction.

3. The boiler support structure according to claim 1, wherein the pullout countermeasure is configured such that a pullout proof strength of the respective seismic isolator is increased.

4. The boiler support structure according to claim 2, wherein the pullout countermeasure is configured such that a pullout proof strength of the respective seismic isolator is increased.

5. The boiler support structure according to claim 1, wherein the pullout countermeasure includes load transfer member that transfers the pullout force from the column supported by the respective seismic isolator to another of the columns.

6. The boiler support structure according to claim 2, wherein the pullout countermeasure includes a load transfer member that transfers the pullout force from the column supported by the respective seismic isolator to another of the columns.

7. The boiler support structure according to claim 1, wherein the pullout countermeasure includes:
a first form in which a pullout proof strength of the respective seismic isolator is increased; and a second form including a load transfer member that transfers the pullout force from the column supported by the respective seismic isolator to another of the columns.

8. The boiler support structure according to claim 2, wherein the pullout countermeasure includes:
a first form in which a pullout proof strength of the respective seismic isolator is increased; and
a second form including a load transfer member that transfers the pullout force from the column supported by the respective seismic isolator to another of the columns.

9. The boiler support structure according to claim 3, wherein the pullout countermeasure is further configured so that a neutral axis of a seismic isolation layer does not shift from a position thereof before the pullout countermeasure is installed.

10. The boiler support structure according to claim 3, wherein, in the first form, the pullout countermeasure is further configured so that a neutral axis of a seismic isolation layer shifts from a position thereof before the pullout countermeasure is installed.

11. The boiler support structure according to claim 5, wherein the boiler support structure further comprises a tie beam and/or a horizontal beam, the column supported by the respective seismic isolator and another of the columns are coupled together by the the tie beam and/or the horizontal brace.

12. The boiler support structure according to claim 5, wherein the boiler support structure further comprises an RC slab, the RC slab being provided between the column supported by the respective seismic isolator and another of the columns.

13. The boiler support structure according to claim 11, further comprising a pullout prevention mechanism that couples together the tie beam and the foundation in parallel to the seismic isolator.

14. The boiler support structure according to claim 12, wherein the boiler support structure is configured such that equipment is installed on the RC slab in a region around the column supported by the respective seismic isolator.

15. A method of identifying, by a computer, seismic isolators to be provided with a pullout countermeasure in a boiler support structure including a plurality of seismic isolators,
the boiler support structure comprising a boiler main body; a boiler support steel frame supporting the boiler main body in a suspended state, the boiler support steel frame comprising column bases, a plurality of columns erected on a foundation via the column bases, and a plurality of beams connecting adjacent columns to each other; and the plurality of seismic isolators supporting at least one of the columns, the plurality of seismic isolators being provided on the foundation; and
the method comprising individually determining, by the computer, whether the seismic isolators satisfy the following Formula (1), and identifying each of the seismic isolators that satisfy Formula (1) as a seismic isolator to be provided with a respective pullout countermeasure:

$$N_{Dn}+N_{EQn}>N_m \quad \text{Formula (1)},$$

wherein $N_{Dn}$, $N_{EQn}$, and $N_m$ are defined as follows:
$N_{Dn}$ ($N_{Dn}<0$) is a compressive load occurring on each of the seismic isolators and calculated on the basis of a permanent load imposed on the boiler support structure;
$N_{EQn}$ ($N_{EQn}>0$) is a pullout force occurring on each of the seismic isolators and calculated on the assumption that an earthquake has occurred; and
$N_m$ ($N_m>0$) is an allowable pullout force of each of the seismic isolators and calculated using an allowable pullout stress of the seismic isolator.

16. The method according to claim 15, wherein the pullout force $N_{EQn}$ is calculated on the basis of the following Formula (2):

$$N_{EQn}=M/B_n \quad \text{Formula (2)},$$

wherein M and $B_n$ of Formula (2) are defined as follows:
M is an overturning moment occurring on a seismic isolation layer when a horizontal force P acts at a center of gravity G of a superstructure and calculated on the basis of the following Formulae (3) and (4), the superstructure being a part of the structure located above the seismic isolation layer; and
$B_n$ is a length of an arm of the overturning moment M on each of the seismic isolators, $$P=Sa \times m \quad \text{Formula (3)},$$

$$M=P \times L \quad \text{Formula (4)},$$

where Sa, m, P, and L of Formulae (3) and (4) are defined as follows:
Sa is a response acceleration in a natural period T of the superstructure and calculated from a response spectrum of a design earthquake wave;
m is a mass of the superstructure;
P is a horizontal force on the superstructure; and
L is a distance in a vertical direction from the center of gravity G of the superstructure to the center of the seismic isolation layer in a height direction.

17. A method of identifying, by a computer, seismic isolators to be provided with a pullout countermeasure in a boiler support structure including a plurality of seismic isolators,
the method comprising individually determining, by the computer, whether the seismic isolators satisfy the following Formula (1), and identifying each of the seismic isolators that satisfy Formula (1) as a seismic isolator to be provided with a respective pullout countermeasure:

$$N_{Dn}+N_{EQn}>N_m \quad \text{Formula (1)},$$

wherein $N_{Dn}$, $N_{EQn}$, and $N_m$ are defined as follows:
$N_{Dn}$ ($N_{Dn}<0$) is a compressive load occurring on each of the seismic isolators and calculated on the basis of a permanent load imposed on the boiler support structure;
$N_{EQn}$ ($N_{EQn}>0$) is a pullout force occurring on each of the seismic isolators and calculated on the assumption that an earthquake has occurred; and
$N_m$ ($N_m>0$) is an allowable pullout force of each of the seismic isolators and calculated using an allowable pullout stress of the seismic isolator.

* * * * *